(Model.)
D. B. TIFFANY.
FISHING STAKE.
No. 279,508. Patented June 12, 1883.
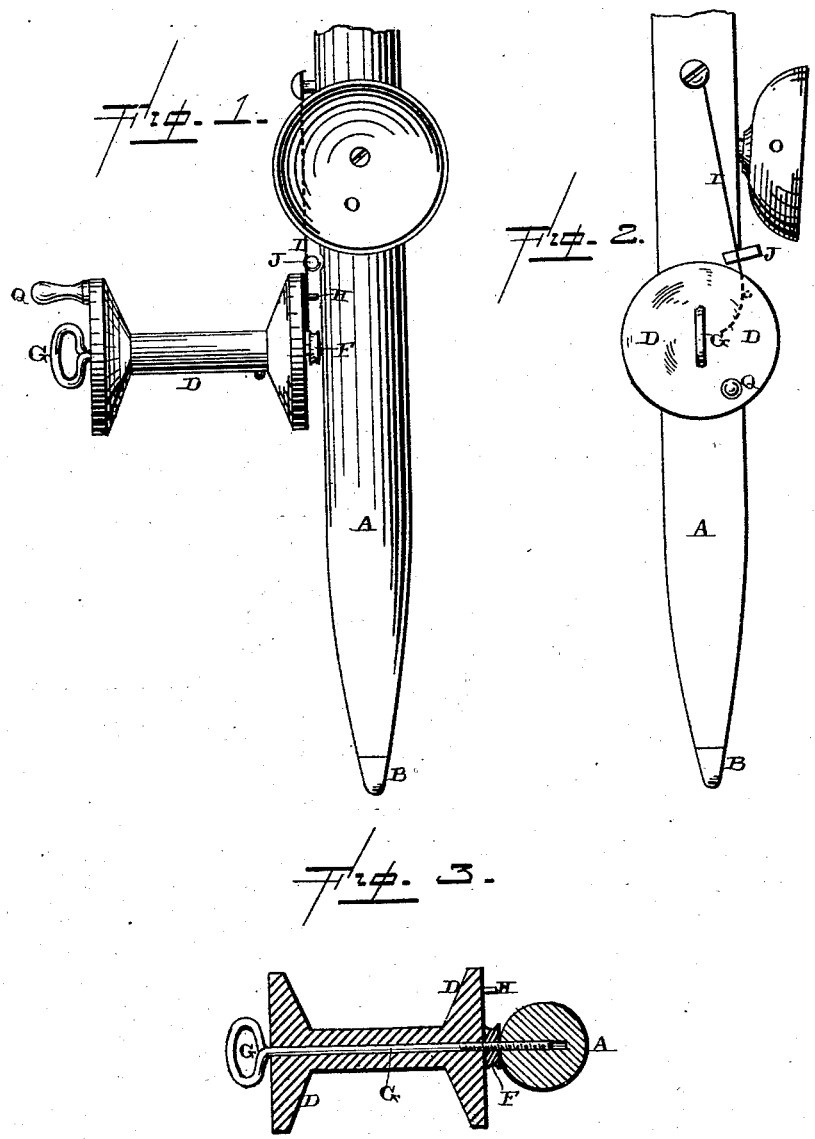
Witnesses.
Louis F. Gardner
J. W. Garner
Inventor.
D. B. Tiffany,
per F. A. Lehmann,
Atty.

UNITED STATES PATENT OFFICE.

DAVID B. TIFFANY, OF XENIA, OHIO.

FISHING-STAKE.

SPECIFICATION forming part of Letters Patent No. 279,508, dated June 12, 1883.

Application filed February 13, 1883. (Model.)

*To all whom it may concern:*

Be it known that I, DAVID B. TIFFANY, of Xenia, in the county of Greene and State of Ohio, have invented certain new and useful Improvements in Fishing-Stakes; and I do hereby declare the following to be a full, clear, and exact description of the invention, such as will enable others skilled in the art to which it pertains to make and use it, reference being had to the accompanying drawings, which form part of this specification.

My invention relates to an improvement in fishing-stakes; and it consists in the combination of a stake which is to be driven into the ground, and which is provided near its upper end with a bell or a gong, a spring-wire provided with a striking device, and a reel which is attached to the stake by means of a clamping screw or bolt, which can be used to allow the reel to revolve freely thereon, or can be used to clamp the reel tightly in position, so that it cannot turn at all, as will be more fully described hereinafter.

The object of my invention is to provide a stake having a reel attached thereto, around which the fishing-line is wound, so that when a fish takes hold of the hook attached to the line the rapid revolution of the reel as the line is being drawn from it will cause an alarm to be sounded, and thus attract the attention of the fisherman to that particular line.

Figures 1 and 2 are side elevations of my invention, taken at right angles to each other. Fig. 3 is a horizontal section.

A represents a stake, of any desired construction, which is to be driven into the ground, or have its lower end inserted in a socket of any kind, that is made to receive it. This stake will be of any desired length, and preferably provided with a metallic point at B, so that it is not liable to be injured while being driven into the ground. Screwed into one side of this stake at a suitable distance above the ground is the screw-rod or clamping-bolt G, upon which is placed the reel D, around which the fishing-line is to be wrapped. Between the inner end of the reel and the side of the stake, upon this screw-bolt, is placed a suitable washer, F, which prevents the end of the reel from being clamped against the side of the stake itself. This clamping-rod can be loosened sufficiently to allow the reel to revolve freely upon it, and can be tightened in such a manner as to hold the reel perfectly rigid and prevent it from revolving at all. Upon the outer end of the reel is provided a small handle, Q, by means of which the line can be rapidly wound upon the reel.

Upon the inner end of the reel is formed a stud or projection, H, which serves to operate the spring-wire I, which has a suitable hammer, J, attached to it. When the line is being wound upon the reel the reel does not operate the hammer so as to sound an alarm; but when a fish catches hold of one of the hooks and begins to draw the line from the reel, at each revolution of the reel the hammer is made to strike the gong O, which is attached near the upper end of the stake, and thus call the attention of the fisherman to that particular line. The gong will be of any suitable construction, and attached to the stake, with a suitable washer in between them, so that the gong or bell will be left free to vibrate.

Where a fisherman has out a large number of lines it is very necessary that his attention should be called to any particular line upon which a fish has been hooked, and for that reason each stake should be provided with an alarm. In fishing for eels, where the lines are left over night, the alarm is not necessary; and hence the fisherman must be provided with some means by which he can regulate the exact length of line that is necessary. For this reason the reel is placed upon a clamping-rod which will hold the reel perfectly rigid and prevent any more of the line from being unwound from it.

I am aware there is nothing new in the mere use of an alarm used in connection with a reel, and I do not therefore broadly claim such a device.

I am aware that a fishing-stake provided with a reel and an alarm mechanism is not new, and this I disclaim. My invention differs from these in placing the reel upon a clamping-screw, so that the reel can be allowed to freely revolve and thus sound an alarm, or be locked in place, so that the line cannot be drawn off when left at night.

Having thus described my invention, I claim—

The combination of the stake A, the reel D, the washer F, screw clamping-rod G, which passes through the reel directly into the stake, the projection H on the end of the reel, the spring-actuated hammer J, and gong O, the parts being combined and arranged to operate substantially as shown.

In testimony whereof I affix my signature in presence of two witnesses.

DAVID B. TIFFANY.

Witnesses:
H. McQUISTON,
JOHN LITTLE.